United States Patent Office 3,192,973
Patented July 6, 1965

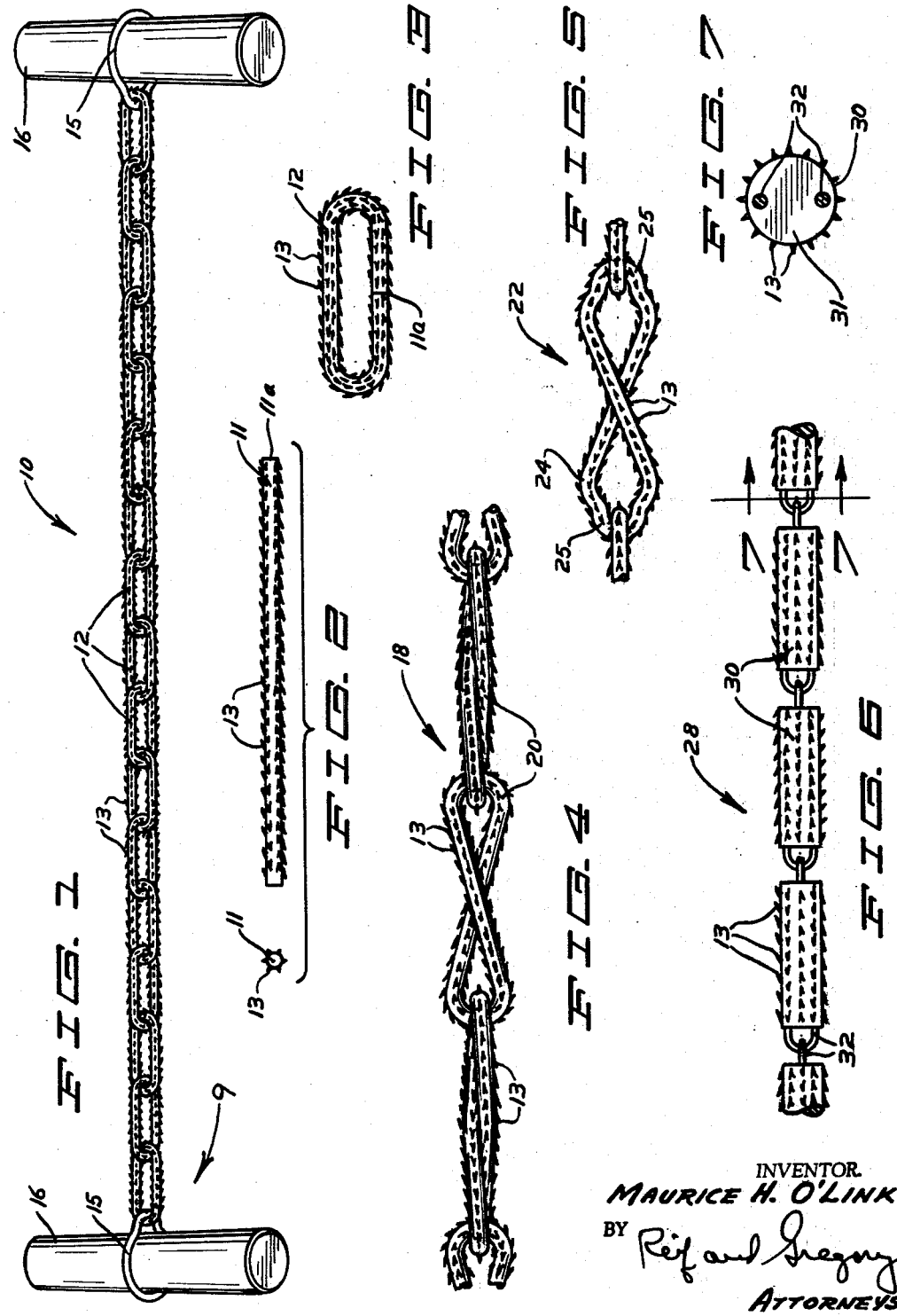

3,192,973
FLEXIBLE SAW STRUCTURE
Maurice H. O'Link, St. Cloud, Minn., assignor to Stearns Manufacturing Company, St. Cloud, Minn., a corporation of Minnesota
Filed Feb. 28, 1964, Ser. No. 348,029
4 Claims. (Cl. 145—31)

This invention relates to an improvement in a flexible hand saw and particularly a saw of such construction as would be convenient for use by hunters, foresters and for general utility.

The prior art discloses flexible hand saws formed as of twisted toothed blades and of tubular cutting members carried on a cable type of core, but saws of such character have a tendency to be relatively brittle and to break if arched at a sharp cutting angle. The applicant's structure provides improvement to overcome deficiencies present in such hand saws.

It is an object of this invention therefore to provide a hand saw comprising a cutting blade formed of a multiplicity of cutting units or members linked together to form a chain-like structure.

It is another object of this invention to provide a hand saw comprising a blade in which individual cutting units may be replaced or upon the removal of one or more cutting units the remaining portions of the blade may be joined together.

It is a further object of this invention to provide a hand saw which for storage purposes may be collapsed into a small mass.

It is also an object of this invention to provide a saw comprising a blade which may be operated successfully while arched at a sharp cutting angle without causing any unusual stress on the cutting units or the structure of the blade as a whole.

It is also another object of this invention to provide a hand saw adapted to have used as handles therewith any convenient relatively short stick-like members which may be available.

These and other objects and advantages of the invention will be set forth in the following description made in connection with the accompanying drawings in which like reference characters refer to similar parts throughout the several views and in which:

FIG. 1 is a perspective view of applicant's device;

FIG. 2 is a composite view showing in a preliminary stage a detail of structure of applicant's device in side elevation and in end view;

FIG. 3 is a top plan view of a detail of applicant's device;

FIG. 4 is a fragmentary view on an enlarged scale in side elevation showing a modification of applicant's device;

FIG. 5 is a view similar to that in FIG. 4 showing a modification of applicant's device;

FIG. 6 is a view similar to FIG. 4 showing a modification of applicant's device; and FIG. 7 is a view in vertical section taken on line 7—7 of FIG. 6 as indicated.

Referring particularly to FIGS. 1–3, a preferred embodiment of applicant's device is indicated generally by the character 9. Said device comprises a member indicated generally by the character 10 forming a cutting blade and having handles 16 at either end thereof removably secured by ring members 15 linked to the respective end portions of said blade 10.

Said blade 10 may be variously formed within the scope of applicant's inventive concept. In the instant embodiment said blade is made up of a multiplicity of link members 12 which form the cutting members of said blade. It is obvious that said cutting blade may be of any desired or convenient length.

Said link members 12 are formed of blank members 11 shown here as being cylindrical in form and of such a diameter that an endless link may be formed thereof having a width on the order of ⅛ inch. It will be understood that the cross section of said blank member may be of any other desired form such as being elliptical or angular in cross section. Formed on said blank member by means well known in the art are projecting cutting teeth 13. The forming of the teeth is no part of the invention herein.

In the illustrations here shown, said teeth are disposed in rows circumferentially spaced about said blank members 11 and extending longitudinally thereof. It will be noted that the adjacent rows of teeth project to cut in opposite directions whereby the assembled saw blade 10 will provide a cutting stroke with each reciprocal movement thereof in operation. Said teeth will project sufficiently to provide good effective cutting results. Said blank members 11 will be formed of suitable material and will be suitably tempered or hardened to provide lasting and effective cutting teeth.

A suitable number of said blank members 11 will be formed into endless links having their respective end portions 11a in abutting engagement and said links will be linked with one another in the form of a linked chain. The forming of the blank members into links and the linked engagement of said links will be carried out by practice well known in the art and forming no part of the inventive concept herein.

Linked to each of the end cutting members of said blade member 10 are the ring-like members 15. Said members 15 will be of adequate size to removably receive therein handles 16 of suitable length and cross section. Said handles may be formed of any suitable stick material. For hunting and forestry purposes, for example, with stick material available wherever the operator may be, it would not be necessary to carry any prepared handles for the saw and the saw may be carried conveniently in a pouch.

In view of the order of the transverse dimension or width of the links of the saw blade and with the cutting members 12 consecutively being disposed in planes normal to one another, a relatively small and uniform kerf results from the use of applicant's saw. Applicant's device is particularly useful for the hunter in cutting up relatively large game. In use, the blade 10 may be sharply arched longitudinally, or in other words it may be operated at a sharp cutting angle without placing any additional strain on the blade than if the blade were used for cutting purposes disposed in a common plane. Thus applicant's saw is particularly adaptable to specific cutting or operating conditions.

With reference to FIG. 4, a modification of applicant's device is shown in which the cutting blade indicated generally by the character 18 comprises link members 20 which will be formed of said blank members 11 having said projecting teeth 13, but will differ from the link members 12 in specific configuration. The link members 20 are each shown in the form of a figure 8 having linked engagement as illustrated to form the blade 18.

A further modification is indicated in FIG. 5 in which the saw blade member indicated generally by the character 22 comprises link members 24 each of which are generally in the form of a figure 8 but have extended or bulging end portions 25 of somewhat reduced width with said end portions of adjacent links having linked engagement to form the blade member 22.

A final modification of applicant's device is shown in FIGS. 6 and 7 wherein the saw blade member indicated generally by the character 28 is formed of a multiplicity of linked cutting members 30 respectively formed of blank cylindrical stock on the order of member 11 but of somewhat greater cross section and said members 30 have at each end thereof formed to be integral therewith handle or linking portions 32 for linking engagement with one another.

With reference to the modifications of structure shown, each of these is equipped with the same handle arrangement as the embodiment shown in FIG. 1.

The application or use of the applicant's device is quite obvious from its description. It represents substantial improvement in permitting an effective cutting operation regardless of the cutting angle in which the cutting blade member is disposed without having any additional strain being placed thereon. The flexibility present in having an effective cutting blade formed of link members makes this possible and provides a very effective and efficient tool. Link members are readily removed or added as may become desirable or necessary. The device itself is readily collapsed into a small mass for carrying or for storage purposes and there is no need to carry prepared handles as these may be readily formed at any site of use where sticks or stick material may be available.

It will of course be understood that various changes may be made in the form, details, arrangement and proportions of the parts, without departing from the scope of applicant's invention which, generally stated, consists in a structure capable of carrying out the objects above set forth, in the parts and combinations of parts disclosed and defined in the appended claims.

What is claimed is:
1. A flexible hand saw comprising
a saw blade formed of a multiplicity of links,
each of said links comprising a cylindrical rod, cutting teeth projecting from said rod spaced circumferentially thereabout,
said cylindrical rods being reversely curved to form endless links,
said links respectively being linked with one another, and
handle portions carried at either end of said blade.
2. The structure set forth in claim 1,
said teeth being circumferentially disposed in longitudinally extending rows with each adjacent row of teeth extending in opposite cutting directions.
3. A flexible hand saw comprising
a multiplicity of cutting members,
cutting teeth projecting from said members and spaced thereabout,
said cutting members being arranged and constructed to be linked together,
said cutting members each being in the form of a figure 8, and
an elongated cutting member formed of said cutting members in linked engagement.
4. A flexible hand saw comprising
a multiplicity of cutting members,
cutting teeth projecting from said members and spaced thereabout,
said cutting members being arranged and constructed to be linked together,
said cutting members each being in the form of a figure 8,
the opposed end portions of each of said cutting members being deformed to bulge oppositely of one another for linked engagement with like portions of adjacent links, and
an elongated cutting member formed of said cutting members in linked engagement.

References Cited by the Examiner
UNITED STATES PATENTS 2,751,736  6/26  Hessemer.
2,988,118  6/61  De La Tramerye _____ 145—31 X WILLIAM FELDMAN, *Primary Examiner.*
MILTON S. MEHR, *Examiner.*